United States Patent [19]
Wallace

[11] Patent Number: 5,817,177
[45] Date of Patent: Oct. 6, 1998

[54] APPARATUS FOR APPLICATION OF LIQUID MATERIALS ONTO SUBSTATES

[76] Inventor: John S. Wallace, 977 Yarmouth Rd., Bloomfield Village, Mich. 48301

[21] Appl. No.: 705,726

[22] Filed: Aug. 30, 1996

Related U.S. Application Data

[62] Division of Ser. No. 270,598, Jul. 5, 1994, Pat. No. 5,672,376.

[51] Int. Cl.⁶ ..................................................... B05C 11/00
[52] U.S. Cl. ......................... 118/69; 118/620; 198/690.1; 198/803.6; 427/598
[58] Field of Search .............................. 427/598; 118/623, 118/620, 556–558, 69; 198/690.1, 803.6

[56] References Cited

U.S. PATENT DOCUMENTS

| | | | |
|---|---|---|---|
| 2,696,449 | 12/1954 | Ericks et al. ............................. | 427/424 |
| 3,863,658 | 2/1975 | Kramb et al. .......................... | 198/690.1 |
| 3,917,054 | 11/1975 | Hurst ..................................... | 198/690.1 |
| 4,120,993 | 10/1978 | Duffy et al. ............................ | 427/318 |
| 4,828,887 | 5/1989 | Toutant et al. .......................... | 427/424 |
| 4,835,819 | 6/1989 | Duffy et al. ............................ | 118/308 |
| 4,842,890 | 6/1989 | Sessa et al. . | |
| 5,169,621 | 12/1992 | DiMaio et al. ......................... | 118/308 |
| 5,443,643 | 8/1995 | Cardini et al. .......................... | 118/712 |

*Primary Examiner*—Bernard Pianalto
*Attorney, Agent, or Firm*—Myers, Liniak & Berenato

[57] ABSTRACT

A method and apparatus for application of liquid materials onto substrates is provided. The present invention allows high speed selective application of curable liquids to a continuous succession of discrete substrates and subsequent curing of those liquids in order to form a solid or foamed coating on at least a portion of the substrates. The present invention provides increased speed efficiency and adherence of the liquid cured onto the substrates.

13 Claims, 4 Drawing Sheets

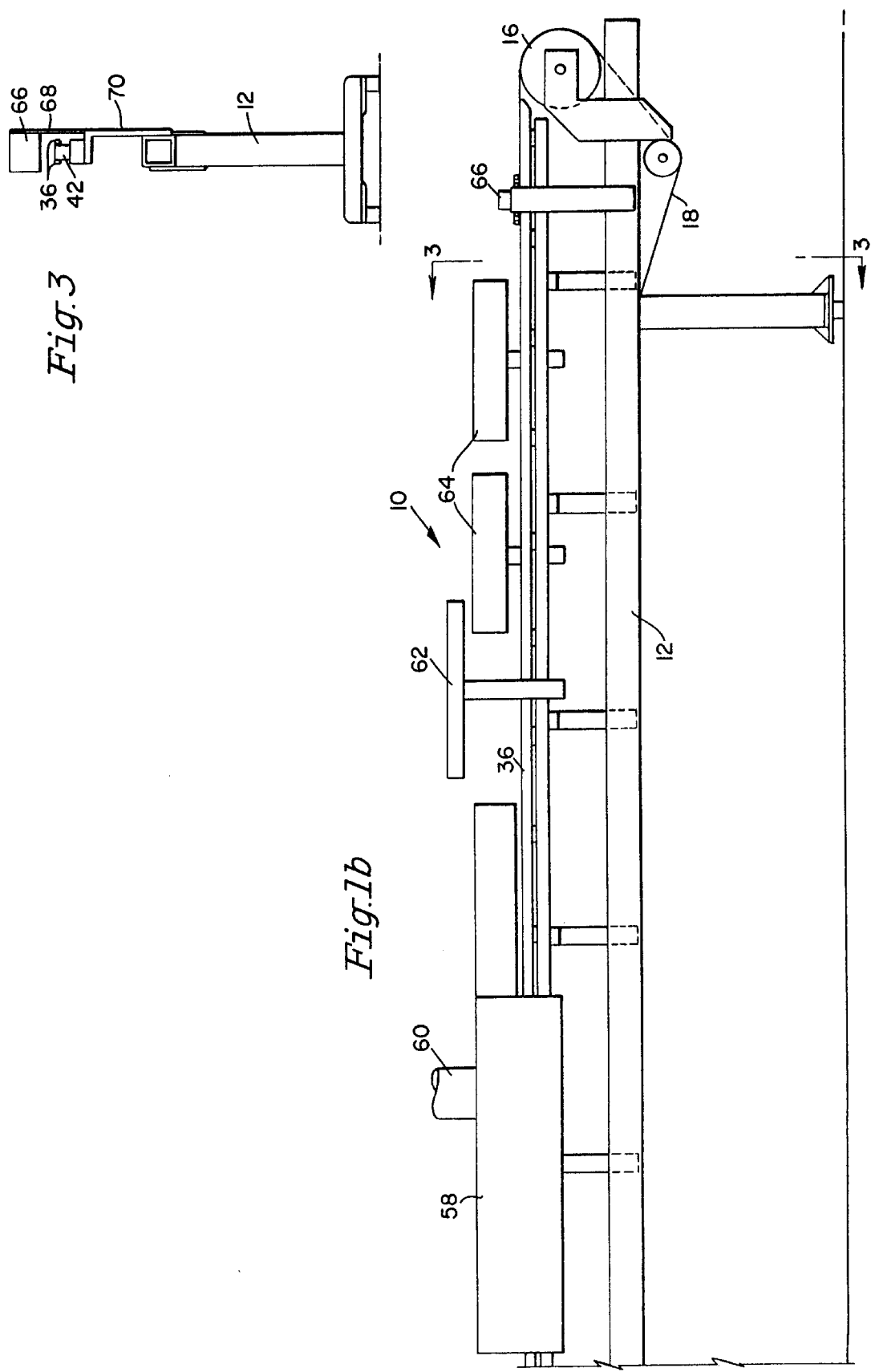

APPARATUS FOR APPLICATION OF LIQUID MATERIALS ONTO SUBSTATES

This is a division of application Ser. No. 08/270,598, filed Jul. 5, 1994, U.S. Pat. No. 5,672,376.

BACKGROUND OF THE INVENTION

This invention relates to a method and apparatus for applying a variety of liquid materials to substrates. More particularly, the present invention relates to a method and apparatus for high speed selective application of heat or otherwise curable liquids to a continuous succession of discrete substrates and subsequently curing those liquids in order to form a solid or foamed coating on at least a portion of the substrates.

The term cured is used throughout this application to refer to changing material from a liquid to a polymeric solid or solid-like state. It has been known for decades that liquids such as polyvinyl chloride (PVC) can be heat cured onto solid substrates. These heat curable PVC liquids have been used to create a wide variety of discrete plastic products from toys to tools. It is also known that such liquids can be applied to and cured in place on metal or certain non-metal substrates to accomplish various functions. Such liquids are commonly applied in order to create a seal that is integral to the substrate. When the item with such a seal applied thereto is subsequently assembled against another component, the integral seal serves to prevent liquids and/or gasses from leaking. In many applications integral seals or gaskets have been consistently found to be more effective than those that are not integral in preventing leakage. Also, since integral seals or gaskets are already attached to substrates, the risk of accidentally assembling two components without a seal or gasket is eliminated.

For example, it is known to apply a PVC liquid underneath the head of a self tapping sheet metal fastener and to subsequently cure the PVC material. The cured PVC material then acts to form an integral seal about the underside of the head of the screw. A typical application would be to use such a screw with an integral PVC seal in the construction of sheet metal buildings in order to prevent rain water from seeping around the fastener head and dripping into the building. Another example of the use of heat curable liquids is the creation of integral gaskets on sheet metal stampings used in the creation of metal cans that are intended to contain liquids. To prevent possible leakage along the crimped seam, heat curable liquid is flowed around the engaged area of the crimp and cured in place in order to form a pliable, attached gasket. The desire for the types of seals and gaskets discussed has been growing considerably in industries such as automotive and consumer products.

Although the demand for selective application of heat curable liquid materials such as PVC, urethanes, silicons, plastisols or other polymeric dispersions onto a portion of metal and other substrates in order to form seals, gaskets and the like continues to increase, known methods and apparatus for applying such coatings suffer from some rather serious drawbacks. Existing devices have been largely inadequate in providing precise selective coatings of discrete substrates with such materials. Since the delivery of liquid material must be precise and discontinuous, devices that have accomplished reasonable results in continuous selective coating of a large number of discrete substrates have usually been very slow. Those devices that have exhibited reasonable speed of production have usually required the substrate to be positioned in a very particular orientation or precisely rotated during the application process. Many of these types of devices have required rather elaborate positioning and holding structures for each article being processed.

In addition, many known devices are either totally incapable or not readily capable of applying different types of material to a variety of substrates of different sizes, shapes and materials. In many of these known devices, frequent problems have arisen in controlling heat build up during processing, particularly with larger substrates or in connection with substrates of certain materials. An uneven or excessive application of heat to a succession of substrates can lead to degradation of the liquid material and insufficient formation or adherence of the seal or gasket. It is clear, therefore, that the need exists in the art for a better method and apparatus for applying such materials to substrates.

SUMMARY OF THE INVENTION

The present invention provides an improved method and apparatus for high speed selective application of a variety of curable liquids onto a continuous succession of discrete substrates of a variety of shapes, sizes and materials, in order to form seals, gaskets and the like thereon. It is therefore an object of the present invention to provide an improved method and apparatus for the application of a variety of heat or otherwise curable liquids onto a continuous succession of discrete substrates.

A further object of the present invention is to provide an improved method and apparatus for high speed application of heat curable liquids onto a continuous succession of discrete substrates.

An additional object of the present invention is to provide an improved method and apparatus for high speed application of heat curable liquids onto a continuous succession of discrete substrates of a variety of different shapes, sizes and materials.

Another object of the present invention is to provide an improved method and apparatus for the application of heat curable materials onto substrates that is capable of utilizing a variety of different liquid heat or radiation curable materials.

Still another object of the present invention is to provide an improved method and apparatus for precise selective application of heat curable materials onto substrates of a variety of different shapes, sizes and materials.

A still further object of the present invention is to provide an improved method and apparatus for high speed application of heat curable liquids onto a continuous succession of discrete substrates to form an integral seal or gasket thereon.

Yet another object of the present invention is to provide an improved method and apparatus for high speed application of heat curable liquids onto a continuous succession of discrete substrates that exhibits improved heat control both within the apparatus and on the substrates themselves.

Still another object of the present invention is to provide an improved method and apparatus for high speed application of heat curable liquids that utilizes a novel parts feeding system.

A further object of the present invention is to deposit curable liquids onto substrates in a manner that does not require rotation of the substrates or a separate positioning means for each substrate.

A still further object of the present invention is to provide an improved method and apparatus for high speed application of heat curable liquids onto a continuous succession of discrete substrates that results in increased adhesion values between the cured liquid and the substrate.

These and other objects of the invention are satisfied by a method and apparatus for selective application of heat curable liquid material to a portion of a discrete article, having means for movably supporting the article, stationary magnetic means for stabilizing the articles on the support means for treatment, means for applying discrete amounts of heat curable liquid material onto a selected portion of the article, means for positioning the applying means being capable of selective adjustment of the location of the applying means along at least two different axes in relation to the article and means for heating the article in order to cure and adhere the heat curable liquid material applied to the article.

BRIEF DESCRIPTION OF THE DRAWINGS

The invention will be described further in connection with the attached drawings, wherein like reference numbers refer to corresponding parts throughout the several views of preferred embodiments of the invention and wherein:

FIG. 1b is a side sectional view of the remainder of the device for the application of heat curable liquids onto a continuous succession of substrates, as set forth in FIG. 1a.

FIG. 3 is a side sectional view taken along the lines 3—3 of FIG. 1b.

FIG. 4 is a cross-sectional view taken along the lines 4—4 of FIG. 1a.

DETAILED DESCRIPTION OF THE INVENTION

Figure 1A:
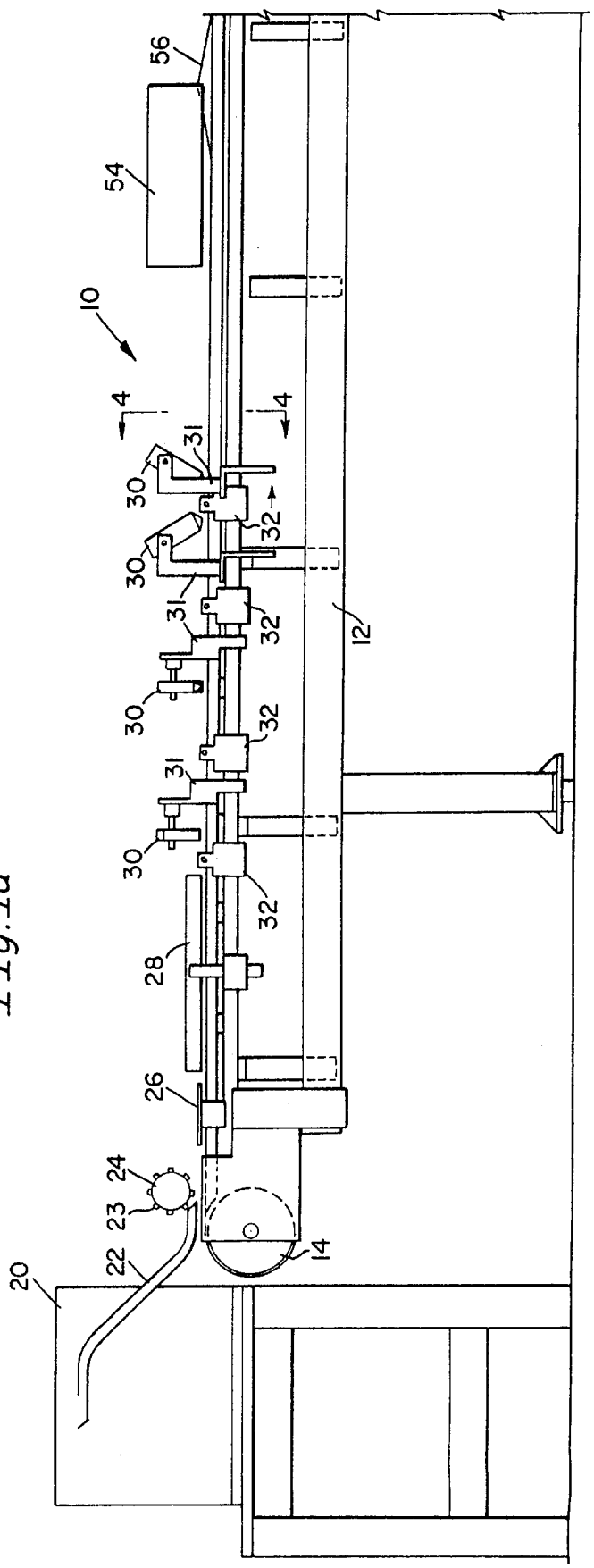
FIG. 1a is a side sectional view of a portion of a device for the application of heat curable liquids onto a continuous succession of substrates.

Referring to the drawings and, in particular, FIGS. 1a and 1b, a device 10 is illustrated for the high speed selective application of heat curable liquids onto a portion of a continuous succession of discrete substrates of varying shapes, sizes and materials. The liquid material is applied, then cured on a variety of parts to form a solid or foamed coating which can serve as among other things a formed-in-place seal, vibration absorber, noise dampener, mask, gap filler, and/or friction increaser. The term cure is used in the present application to refer to changin material from a liquid to a polymeric solid or solid-like state. Some of the preferred applications for applying and depositing such heat curable materials onto substrates include the formation of seals under the heads of metal fasteners to prevent liquid or gas leakage in an assembly and gaskets formed around metal stampings which are subsequently crimped together with other components to prevent liquid or gas seepage from a container. The applications set forth above are intended to be exemplary only and the present invention is in no way limited to those particular examples.

It should also be understood that, in accordance with the present invention, almost any heat curable liquid material can be effectively utilized by the device 10 to form a variety of deposits on the substrates. Preferred heat curable liquid materials have been found to be polyvinylchlorides (PVC), urethanes, silicons, plastisols or other polymeric dispersions in liquid form. The device 10 can also be utilized in connection with catalyzed or reactable materials such as U-V curable liquids by modifying the downstream areas of the device to include radiation sources used alone or in combination with the heat sources described more fully below. It should also be understood that, although the present invention is particularly useful in applying heat curable liquid materials onto metal or plastic substrates, these substrates can consist of other materials as long as they can withstand the heat that is applied to them during the course of operation of the device 10. The device 10 is supported by a base 12 which forms a flat stable point of attachment for the other elements of the device 10. A continuous conveyor belt 18 runs the entire length of the device 10 between drive sheave 14 and drive pulley 16. As will be described in detail below, drive sheave 14 can be optionally magnetized. The conveyor belt 18 provides a flat stable moving surface for articles 11 to be processed in accordance with the present invention. The conveyor belt 18 must be wide enough to accommodate the articles 11 that are to be processed and preferably should be somewhat wider than the widest part of the articles 11. A number of different materials can be used for the conveyor belt 18 provided that they have good heat resistance and provide a non-stick surface. Optionally the belt itself could also be magnetized. A particularly preferred type of conveyor belt has been found to be a Teflon coated fiberglass belt that is approximately 2" inches wide and approximately 0.050" inches thick.

Referring specifically now to FIGS. 1a and 1b, one embodiment of an entire device 10 is illustrated. Device 10 must be provided with a system for continuous delivery of parts onto the conveyor belt 18 for subsequent processing. In order to deliver discrete articles 11 such as the tops for liquid paraffin candles onto the conveyor belt 18 of the device 10, a number of known parts delivery systems including hand feeding can be utilized. A particularly useful known parts feed system utilizes a parts feeder bowl 20 that delivers articles to a parts chute 22 in a closely spaced, uniform orientation. The articles 11 then pass under a loading wheel 24 where they are urged off of the chute 22 and onto the conveyor belt 18, such that one of the surfaces of the articles 11 contacts the top surface of the conveyor belt 18. The stops 23 located on the outer circumference of the loading wheel 24 help to insure that the articles 11 that are loaded onto the moving conveyor belt 18 will be positioned in the same orientation on conveyor belt in a closely spaced uniform manner.

Known vibratory feed systems do pose drawbacks, however, particularly when they are used in conjunction with headed fasteners. For example, carbon steel sheet metal screws have to be processed heads running down on the belt in order to pool the heat curable liquid under their heads to form an integral seal. Due to the design of known vibratory feed systems such fasteners are fed out of a parts orienter in a head up position. The fasteners then must be subsequently fed down a twist type feed rail which then inverts them to the required head down position for introduction and travel along the conveyor belt 18 of the present invention. Twist tracks, however, are notoriously subject to jamming and therefore can negatively affect production rates.

Figure 2:
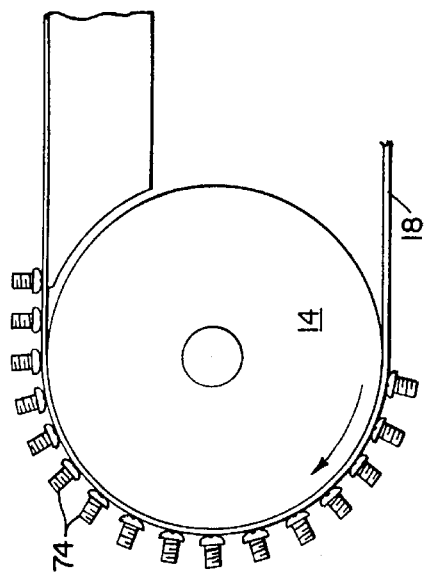
FIG. 2 is a partial side view of an alternative method of placing particles on the continuous conveyor belt system of the present invention.

FIG. 2 illustrates a novel parts feed system that is particularly useful when the articles to be processed are headed fasteners such as an unslotted threaded fastener 74. In this embodiment, instead of a vibratory parts feeder bowl 20, a permanently magnetized drive sheave 14 is provided. The fasteners 74 are introduced to the conveyor belt 18 by contacting it with the heads of the fasteners 74 when the belt 18 is at or near the bottom of the drive sheave 14. The magnetic forces of the sheave 14 cause the fastener heads to be retained and stabilized on the surface of the conveyor belt 18. The fasteners subsequently continue to travel along the path of the belt 18 as it rotates around the sheave 14.

Once the fasteners 74 retained on the conveyor belt 18 reach the top of the drive sheave 14, they are in a position where the threaded portion of the fastener 74 is above the head of the fasteners 74 which is in contact with the belt 18. The fasteners 74 then continue along the moving conveyor belt 18 in a linear manner for subsequent processing. Once the articles are introduced onto the conveyor belt 18 by any of the described parts delivery system an additional structure such as a parts guide 26 can be provided to promote increased processing efficiency. The parts guide 26 urges all parts into the correct orientation and/or lateral position along the conveyor belt 18.

Figure 4:
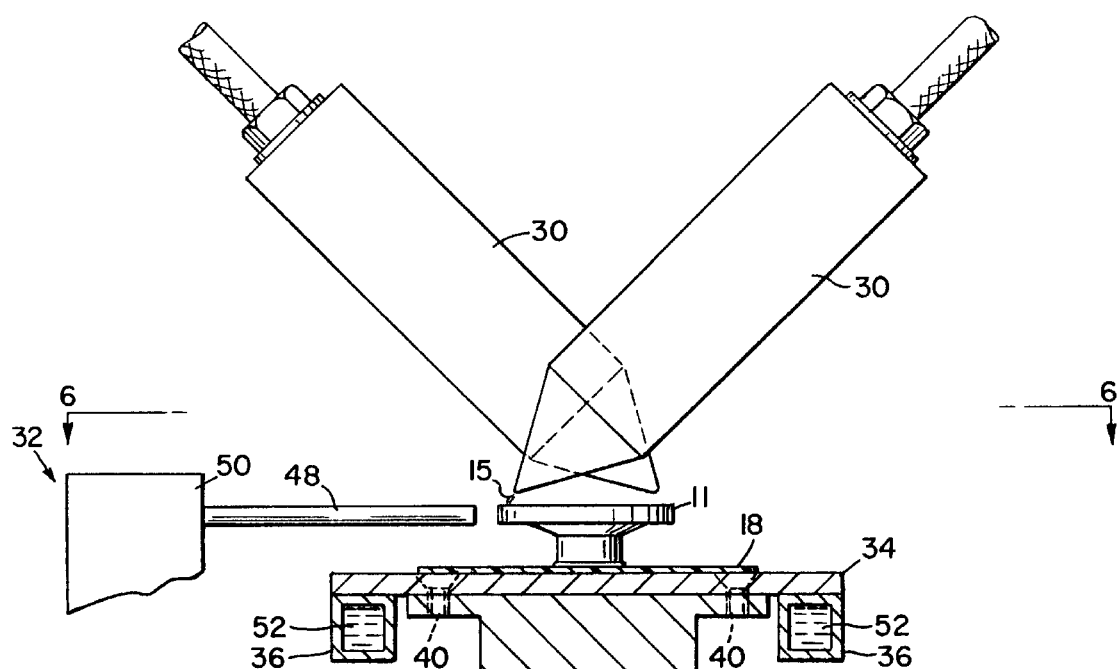
Figure 5:
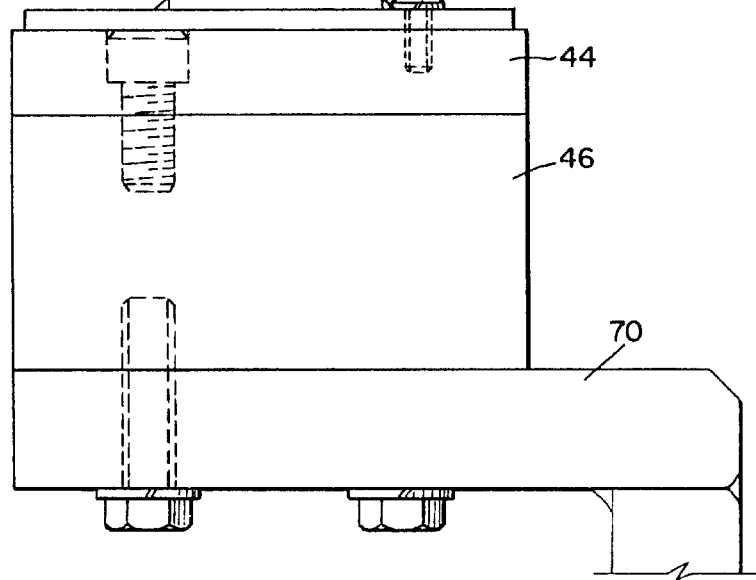
FIG. 5 is a cross-sectional view of a discrete article having had heat curable liquid material selectively deposited thereon by the present invention.

Referring now to FIG. 4 in combination with FIGS. 1a and 1b, the conveyor belt 18 runs over a bed which consists of a continuous magnet 42 embedded flush with the top of a mounting plate 38. The magnet 42 runs the entire length of the top surface of the belt 18. Magnet 42 could be a single continuous magnetized iron rail or a series of spaced discontinuous magnets. Although many different types of arrangements and powers of magnets can be utilized, particularly preferred results were achieved using magnetized iron rails rated at about 375 Gause. Capping the magnet 42 and riding just under the belt 18 is a thin strip 34 which serves as a low friction surface for the belt 18 to ride on and as a heat sink to control heat build up in the belt 18 as it passes through the various heating stages that are present in the device 10. The strip 34 spans substantially the entire length of the top surface of the belt 18. The strip 34 can be constructed of a variety of different materials, however, it has been found that a thin brass strip serves the dual purposes of providing a low friction surface for the belt 18 to ride on and also operates as a heat sink to prevent heat build up in the conveyor belt 18.

One of the important beneficial aspects of the present invention is that once articles are introduced onto the conveyor belt 18 the embedded magnet 42 acts through the strip 34 and belt 18 to attract and hold metal pieces having either flat or curved surfaces firmly on the moving conveyor belt 18 without any additional structure. In this manner, the magnet 42 eliminates the need for clips or individual magnets to be provided for each article that also need to be synchronized or indexed with the flow of discrete articles in order to secure these parts. The magnet 42 is effective for securing the discrete articles 11 against tipping or moving due to pulsations in the belt drive system and from general machine vibrations.

As will be more fully described hereafter, the articles processed by the present invention traverse through a number of heating or radiation stations to encourage the flow out and cure of the materials that are applied thereto. Some of these heating stations are optional depending upon the type of articles processed. In order to maintain the fastest possible rate of speed for production of continuous articles with such heat curable materials, it is most important to insure that heat does not build up on or in the conveyor belt itself. The heat that affects the articles to be processed should come substantially exclusively from the external heating stations.

To this end, the strip 34 is provided with a pair of cooling tubes 36. The cooling tubes are brazed to the outer edges of the plate 34 and run substantially the entire length of the plate 34. The cooling tubes 36 are preferably constructed of a heat conductive metal such as copper. Although the tubes 36 can take many different shapes, tubes having a rectangular cross section have been found to be particularly preferred. This configuration of tube 36 provides an open channel for cooling material 52 to flow through and also provides a relatively large contact surface with the plate 34 in order to allow maximum heat transfer to occur. Although different types of coolant can be used a preferred cooling material 52 for use in the tubes 36 is water. It has been found that superior results can be achieved by utilizing room temperature water, although in some situations cooling of the water prior to introduction into the tubes 36 may be preferable. The water cooling action of the tubes 36 and strip 34 allows a stable belt temperature to be maintained which prevents degradation of the belt 18. It also largely prevents uneven belt heat from being transferred into the articles 11 being processed and adversely affecting the liquid flow out once the heat curable material is applied to the articles.

In order to encourage flow out of the heat curable liquid on a succession of discrete articles, it is frequently important to provide the device 10 with the ability to preheat the articles 11 to some extent prior to application of any such material 15. Therefore, once on the conveyor 18, the articles 11 first pass through a preheater such as illustrated at 28. The preheater 28 can consist of ceramic radiant heat elements, high density infrared lights, gas flames, an electronic induction heater or any combination of the above.

The preheater 28 raises the temperature of the articles 11 from room temperature to between 100° and 150° F. upon exit from the preheater 28. The preheater 28 sufficiently warms the articles 11 to influence the rapidity with which the later applied liquid material 15 will subsequently flow around the articles 11. If the articles 11 are too cold or if the viscosity of the heat curable material 15 is too high flow out will not occur rapidly enough to provide the desired seal or gasket on the article 11. In addition, when coating articles that have substantial mass or if the depth of heat curable liquid material 15 to be cured on an article surface is great, curing can be slowed if the base of the article 11 acts as a heat sink to subsequently applied curing energy. The preheater 28 therefore serves to incrementally raise the temperature of the article 11 to assist in keeping the processing speeds of the device 10 as fast as possible.

As the articles 11 travel further down the conveyor belt 18, they next encounter the liquid application section of the device 10. In this section, one or more liquid applicator guns 30 are provided for applying heat curable liquid material 15 to discrete articles 11 that pass by the guns 30 on the conveyor belt 18. Each of the guns 30 is attached to the base 12 by a device such as an applicator stage 31. The stages 31 allow the guns 30 to be secured in fixed locations for application of liquid material 15 to articles 11. The stages can also be subsequently loosened from the base 12 and be repositioned and attached at a different location along the length of the belt 18 to accommodate different sizes or shapes of articles 11. Preferred stages 31 for use in connection with the present invention allow adjustment of each gun 30 along two or three axes. A commercially available stage that meets these requirements is the 4500 Series ball bearing stage manufactured by the Daedal Division of Parker Corporation of Harrison City, Pa.

The stages 31 also enable the vertical distance between the gun 30 and the conveyor belt 18 to be selectively precisely adjusted as well as the horizontal location of the gun in relation to the width of the belt 18. The stages 31 further permit the angle and direction of the guns 30 and therefore also the flow of material 15 issuing therefrom to be selectively adjusted with respect to the conveyor belt 18. Once located and adjusted properly, the guns 30 are positioned in fixed locations and fire discrete metered shots of the heat curable liquid material 15 at each article 11 to be coated as it passes by each of the guns 30. During processing the guns 30 are positioned close to but not in contact with the articles 11.

The guns 30 are capable of accurate high speed metered shots of a wide variety of different heat curable liquids of differing viscosities. These include, but are not limited to, liquids such as PVC, urethanes, silicons and plastisols. It is necessary for the guns 30 to have very high cycle speeds with a particularly clean cut off at the end of each shot. This is critical to maintaining the present invention's desired combination of high production speeds and precise accurate coating of a portion of articles. The guns 30 are fully capable of applying more than 20,000 discrete metered shots of material 15 per hour. Since the precision stages 31 allow adjustment of the distance angle and location of the shot of material 15 from the guns 30 the articles 11, the stages 31 also allow the precision adjustment of the timing of the shot of material in relation to the article location on the belt 18. This is important since as processing speeds go up it is necessary to "lead" the target by firing the shot before each article 11 is directly under each gun 30.

It has been found that a particularly preferred gun 30 for the present invention is one generally used in the application of hot melt adhesives such as the Nordson H-201 zero cavity gun manufactured by the Nordson Corporation of Norcross Ga. Such guns have been found effective in gasketing and sealing applications in connection with the present invention because they deliver precise controlled delivery of discrete shots of liquid material and relatively clog free operation over extended periods of operation. The guns 30 utilize a working hydraulic pressure of between 400 and 1500 psig. They have an operating air pressure of 30 to 100 psig and a supply air pressure of 70 to 100 psig. The guns 30 are capable of operating at 3000 cycles/minute and have a maximum operating temperature of 450° F. with the gun heat being thermostatically controlled by a replaceable heater cartridge. The nozzle diameter range is between 0.008" and 0.040".

Figure 6:
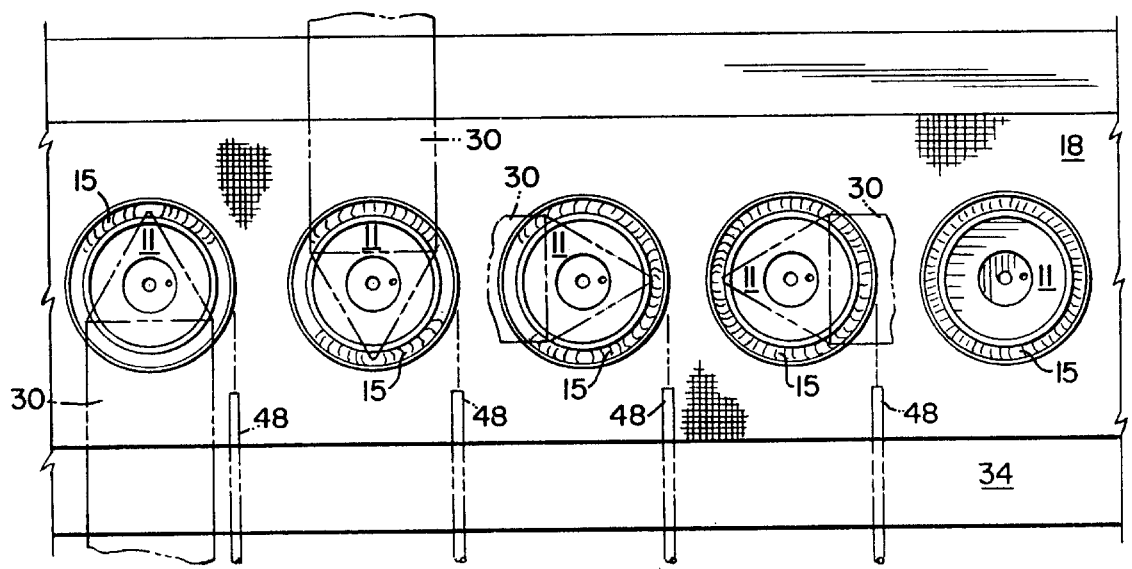
FIG. 6 is a partial top-view of one liquid application system illustrating how heat curable material is deposited onto a plurality of discrete substrates in accordance with one embodiment of the present invention.

The ability of the stages 31 to allow precision adjustment of the timing of the discrete shot issuing from the guns 30 toward the articles 11 is also important with respect to a particularly preferred embodiment of the present invention illustrated in FIGS. 1a, 4 and 6. In this embodiment, deposition of the discrete metered shot of liquid material 15 issuing from each gun 30 is triggered by photo-optic sensors 32. Each sensor 32 features a sensor body 50 that is connected to the base 12 and an adjustable sensor arm 48 that extends from the sensor body 50 substantially parallel to the top surface of the conveyor belt 18 to a location near the articles 11 that are to be coated. The sensors 32 are selectively movable along the length of conveyor belt 18. The sensors 32 are secured in a fixed location during processing. It is preferable to locate a single sensor 32 just ahead of or just behind each of the guns 30 along the length of conveyor belt 18. Each optical sensor 32 is connected to one of the guns 30 in order to provide an appropriate signal to the guns 30 to apply liquid material 15. Although many different sensors could be used, a preferred optical sensor for use in connection with the present invention is an OMRON photoelectric switch (E3A2-XCM4T).

As best illustrated in FIG. 6, if positioned along the conveyor belt 18 after each of the guns 30, the sensors 32 would sense the leading edge of an article 11 and trigger the shot of liquid material to be precisely deposited at a given location of the article 11. The synchronization of the optical sensor and gun is particularly important as processing speeds of the device 10 increase. This requires leading the target by firing the shot early to allow it to be deposited on the appropriate portion of the article 11.

FIG. 6 further illustrates an example of how the guns 30 can be oriented with respect to articles 11 to precisely position the application of hot heat curable liquid material 15. This is particularly important since the selective adjustment of guns 30 allows the device 10 to accommodate and precisely coat selected portions of a wide variety of differently shaped articles that have a number of crevices or ridges in their structure. The arrangement of gun 30 locations illustrated in FIG. 6 was found to be particularly advantageous in providing a ring like seal of material 15 near the outer circumference of a plurality of tops for liquid paraffin candles. Due to the unique structure and capability of the guns 30, this 360° application of material 15 does not necessitate any movement or rotation of the articles 11 apart from the movement of the conveyor belt.

In the application illustrated in FIG. 6 four discrete shots of material 15 are metered one at a time in sequence by four guns 30 on each article 11. Each of the shots of material 15 are initially deposited at approximately 90° intervals around the outer circumference of the discrete articles 11. The material 15 then flows around the circumference of the article 11 from the locations on the article 11 where the material 15 is initially deposited to form a relatively continuous uniform ring like deposit of material 15 around the article 11. This flow out of material can be further encouraged by use of a preheater 28 as previously described.

Figure 7:
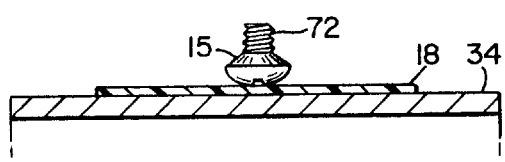
FIG. 7 is a partial sectional view of a portion of a threaded fastener that has had a seal of heat curable material applied thereto.
Figure 8:
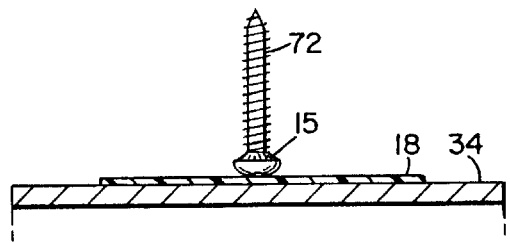
FIG. 8 is a side-sectional view of a threaded fastener that has had a seal of heat curable material applied thereto in accordance with the present invention.
Figure 9:
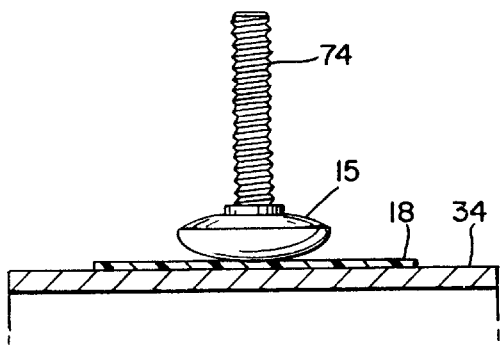
FIG. 9 is a side-sectional view of another type of threaded fastener that has had a seal of heat curable material applied thereto in accordance with the present invention.

It should be understood that in accordance with the present invention any of a wide variety of different parts can have material 15 applied to them in addition to the articles 11 shown in FIG. 6. For example, as illustrated in FIGS. 7–9, the present invention can be utilized to form seals of material under the heads of the threaded fasteners 72 and 74. It has been found that in order to provide seals of material 15 on threaded fasteners such as illustrated in FIGS. 7–9 that it is sometimes advantageous to use only a single gun 30 or two guns located approximately 180° apart around the circumference of the fasteners to establish a proper deposit of material 15 thereon. It should further be understood that the present invention also contemplates processing of other articles utilizing a single gun 30 in certain situations.

Once the articles move along the conveyor belt 18 and are carried beyond the last of the guns 30, the articles are provided some distance along the moving conveyor 18 to allow momentary flow out of the material 15. The articles are then exposed to post material application heating stations in order to accomplish curing of the then liquid material 15. Since the device 10 is capable of not only applying a wide variety of heat curable materials 15 to a variety of substrates of different types, shapes and materials and the thickness of the heat curable material applied will be different, the device 10 includes a variety of heat sources that can be either used separately or in combination to cure the material 15. The heat applied after the material 15 has been applied to the articles 11 is generally more prolonged and intense than that described previously in connection with the preheater 28. The post application heating stations can be ceramic radiant heating elements, high watt density infrared lights, gas flames, electronic induction heaters or any combination of the above. In addition, if material such as a U-V curable liquid is applied to the articles then radiation sources can be substituted for some or all of the heat sources.

A particularly preferred post application heating arrangement that has been proven effective for use in connection with the application of PVC seals to liquid paraffin candle tops will now be described for exemplary purposes. The first post application heating source that the articles 11 encounter along the conveyor belt 18 is a curing heater 54 such as an induction heater. The induction heater is preferably on the order of 15 kilowatts. A curing heater 54 such as an induction heater has the capability of raising the temperature of the articles 11 to about 350° F. to 550° F. For example, if heat curable PVC liquid is used as a coating material the temperature of the applied liquid must rise to about 350° F. for the rapid solidification of thinner liquid cross sections to occur. Caution must be used in the post application heating of the articles 11 not to overheat the heat curable liquid material 15. Such overheating can result in the degradation of the material 15 and therefore the quality and strength of the resultant seal. The use of induction heaters affords another potential advantage when the present invention is used in connection with the coating of non-metal articles. Certain of these parts cannot withstand the heat from infrared heaters required to cure the PVC coatings or seals. By adding iron particles to the PVC, induction heaters can be used to cure the PVC material without damage to the non-metal parts.

Although not required, particularly preferred results have been achieved in terms of increased adhesion of cured liquid materials to substrates when an induction heater has been used as the curing heater alone or in combination with other heat sources. It is believed that this is due to a better cure of the material in the region where it interfaces with the substrate. Such an induction heating system enables full curing of the innermost portions of the deposit from the heat source as efficiently as the outermost portions of the deposit that are located closest to the heat source. This is in contrast to other heating systems such as infrared sources that heat deposits from the outermost portion of the deposit which is closest to the heat source to the innermost portion of the deposit which results in the least amount of cure in the area of the interface between the deposit and the substrate.

Once the articles 11 move past the curing heater 54, it is often desirable to expose them to an additional heat source in order to achieve a complete curing of the liquid material 15. In such cases the articles 11 are then moved further along the conveyor belt 18 until they encounter a post heater 58. Although the post heater 58 can take any of the forms described previously, in the particular embodiment described above it was found to be advantageous to utilize quartz heat lamps. A particularly preferred arrangement involves four heat lamps of 1.6 kilowatts each arranged two on either side of the conveyor belt 18 in spaced parallel relationship. As previously mentioned, the cooling tubes 36 with cooling material 52 running through them are particularly useful during the post application heating stage in controlling and preventing any uneven belt heat from the conveyor belt 18 from soaking into the articles 11 being processed and thereby adversely affecting flow out of the liquid.

Once the conveyor belt 18 has moved the articles 11 to a point where they have exited the post heater 58 an optional black light inspection device 62 can be provided. Device 62 is helpful when applying clear materials to articles 11, wherein it is difficult to insure that proper application of such material has occurred using only the naked eye. The black light inspection system is connected to the base 12 and directs a black light source towards the articles 11 as they pass by on the conveyor belt 18. Under this light source it becomes readily apparent through either visual inspection or inspection by an optical sensor added to the inspection system 62 whether the heat curable liquid material 15 has been accurately and uniformly applied to the articles 11.

Once the articles exit the black light inspection system 62 the conveyor belt 18 next moves them past cooling elements 64. The purpose of this last section of the device 10 is to cool the articles sufficiently so that as they are ejected from the conveyor 18 they can be immediately set into boxes or bins for storage or shipping. A cured but hot coating material 15 can have a tack to the surface which could cause it to stick to other articles 11 if put in a common container too early. This cooling step of the device 10 avoids this problem. The cooling elements usually take the form of fans or blowers. However, another embodiment involves the use of a simple separate extended cooling conveyor that allows the articles 11 time to cure and cool from extended exposure to ambient air to accomplish the same result. Once the articles 11 are sufficiently cooled they can then be removed from the conveyor 18 by using known parts collection systems.

The following example is given to aid in understanding the invention. It is to be understood that the invention is not limited to the particular procedures, articles, temperatures, times or other details given in the sample.

EXAMPLE 1

Flange headed bolts ¼ inch–20×1 inch were deposited onto the moving belt of an apparatus as shown in FIGS. 1a and 1b. The parts were either hand fed or fed through a vibratory bowl. The length of the entire belt was 48 feet which presented an approximately 24 foot track for the bolts to travel. The bolts were deposited with their enlarged head portions resting on the top of the moving conveyor belt. The belt was moved continuously by a 2 inch wide, 6 inch diameter magnetized pulley near the point of introduction of the bolts and a 2 inch wide, 6 inch diameter non-magnetic pulley located at the exit end of the conveyor belt. The conveyor belt was constructed of a Teflon coated fiberglass reinforced material and ran above four sections of permanent magnetic rail.

Two 12 foot long square cooling tubes were run parallel to the top of the belt. These cooling tubes were ⅜ inches square and constructed of copper and utilized room temperature water as a cooling fluid. The bolts were fed at a rate of approximately 200/minute. The belt was moving at a speed of approximately 110 inches/minute. The bolts were preheated using two 1.6 kilowatt quartz preheat lamps positioned one on either side of the belt in parallel spaced relationship. The temperature of the bolts on exit from the preheat lamps was approximately 120° F. The bolts then encountered four Nordson H-201 guns located two on the front side of the belt and two on the rear side. The first gun was located in front of the conveyor about 42½ inches from the entry end of the belt. The second gun was located behind the conveyor about 52 inches from the entry end of the belt. The third gun was located in front of the belt about 58 inches from the entry end of the belt. The fourth gun was located behind the belt about 66 inches downstream.

The four guns each applied a single discrete shot of plastisol to each of the bolts. The flow rate for the guns was approximately ½ gallon/hour and the pressure was approximately 20 psi. The temperature and viscosity of the material was approximately 3000 cps at 100° F. Once the plastisol was applied to the material they were then passed through a 15 kilowatt induction heater and four 1.6 kilowatt heat lamps arranged two in front of the conveyor belt and two behind the conveyor belt in a spaced parallel relationship. The temperature on the belt near the exit of the heat lamps was approximately 550° F. The parts then encountered two cooling fans both located on the back of the conveyor belt in a side-by-side relationship to insure that the material on the bolts did not have any remaining tack. The bolts were then subsequently exited off of the conveyor belt for collection. The cured plastisol seal on the bolts exhibited an average pull off force of about 20 pounds.

From this example, the benefits of the present invention can be seen in the high speed application of heat curable liquids to a continuous stream of discrete articles in a very precise manner.

Having thus described my invention, I claim:

1. An apparatus for conveying parts to be coated, comprising:
    first drive means;
    a second drive means spaced from said first drive means;
    a continuous belt driven between said first and second drive means, said belt having top and bottom surfaces and first and second oppositely disposed edges;
    magnet means positioned close to said belt spanning substantially the entire distance between said first and second drive means;
    a first water cooled tube along a portion of said first edge of said belt between said first and second drive means;
    a second water cooled tube along a portion of said second edge of said belt between said first and second drive means; and
    a conductive plate under and directly adjacent to a portion of said belt between said first and second drive means, said plate connecting said first and second tubes between said first and second edges of said belt in a manner to promote heat transfer between said plate and said first and second tubes.

2. The apparatus of claim 1, wherein said first drive means is magnetized.

3. The apparatus of claim 2, wherein said second drive means is magnetized.

4. The apparatus of claim 1, wherein said belt is magnetized.

5. The apparatus of claim 1, wherein said first and second tubes have a rectangular cross section.

6. The apparatus of claim 1, wherein said plate runs substantially the entire length of said first and second tubes.

7. The apparatus of claim 1, further comprising:
    means for continuously wiping at least one of said surfaces of said belt.

8. The apparatus of claim 1, further comprising:
    means for selectively controlling the temperature of said cooling tubes and said plate.

9. The apparatus of claim 1, wherein said first and second tubes and said plate maintain said belt at a substantially constant temperature between said first and second edges of said belt.

10. The apparatus of claim 1, wherein said belt is comprised of fiberglass.

11. The apparatus of claim 10, wherein said belt has a mesh construction.

12. The apparatus of claim 10, wherein said belt is continuous and aperture free.

13. An apparatus for conveying parts to be coated, comprising:
    first drive means;
    a second drive means spaced from said first drive means;
    a continuous magnetized belt driven between said first and second drive means, said belt having top and bottom surfaces and first and second oppositely disposed edges;
    a first water cooled tube along a portion of said first edge of said belt between said first and second drive means;
    a second water cooled tube along a portion of said second edge of said belt between said first and second drive means; and
    a conductive plate under and directly adjacent to a portion of said belt between said first and second drive means, said plate connecting said first and second tubes between said first and second edges of said belt in a manner to promote heat transfer between said plate and said first and second tubes.

* * * * *